United States Patent
Skog et al.

(10) Patent No.: US 7,969,961 B2
(45) Date of Patent: *Jun. 28, 2011

(54) METHOD AND APPARATUS FOR MAPPING AN IP ADDRESS TO AN MSISDN NUMBER WITHIN A WIRELESS APPLICATION PROCESSING NETWORK

(75) Inventors: Roberg Skog, Hasselby (SE); Ingvar Berg, Nykil (SE)

(73) Assignee: Telefonaktiebolaget (publ), Stockholm (SE)

( * ) Notice: Subject to any disclaimer, the term of this patent is extended or adjusted under 35 U.S.C. 154(b) by 807 days.

This patent is subject to a terminal disclaimer.

(21) Appl. No.: 12/029,560

(22) Filed: Feb. 12, 2008

(65) Prior Publication Data

US 2008/0130623 A1 Jun. 5, 2008

Related U.S. Application Data

(63) Continuation of application No. 10/891,641, filed on Jul. 15, 2004, now Pat. No. 7,339,920, which is a continuation of application No. 09/596,802, filed on Jun. 19, 2000, now Pat. No. 6,775,262.

(60) Provisional application No. 60/188,437, filed on Mar. 10, 2000.

(51) Int. Cl.
*H04J 3/24* (2006.01)

(52) U.S. Cl. .......... 370/349; 370/352; 370/389
(58) Field of Classification Search .......... 370/229–231, 370/235, 252, 310, 328–329, 331, 338, 345, 370/349, 350, 351–357, 360, 389, 392, 395.52, 370/400–402; 455/39, 151.2, 406, 410, 411, 455/412.1, 415, 422.1, 426, 428, 432.1, 43, 455/3, 435, 435.1, 436, 466, 517, 522, 556, 455/575; 705/30, 34, 44, 56, 58, 67, 75, 705/76; 709/206, 219, 220, 227–229, 232; 713/168–170

See application file for complete search history.

(56) References Cited

U.S. PATENT DOCUMENTS

2004/0260816 A1 12/2004 Skog et al.

*Primary Examiner* — Aung S Moe
*Assistant Examiner* — Habte Mered

(57) ABSTRACT

In one embodiment, there is disclosed a system and method for providing access to an IP number or a subscriber identity number associated with a mobile device in a network, the method comprising associating a mobile device with a subscriber identity number; generating a temporary IP number for the mobile device; linking the subscriber identity number with the temporary IP number; storing the subscriber identity number and the temporary IP number in a database; and providing a pull application program interface to extract from the database either the subscriber identity number or the IP address for mobile device when requested by an application program.

18 Claims, 2 Drawing Sheets

METHOD AND APPARATUS FOR MAPPING AN IP ADDRESS TO AN MSISDN NUMBER WITHIN A WIRELESS APPLICATION PROCESSING NETWORK

CROSS-REFERENCE TO RELATED APPLICATIONS

This application is a continuation of co-pending U.S. patent application Ser. No. 10/891,641, filed Jul. 15, 2004, now U.S. Pat. No. 7,339,920 which is a continuation of U.S. patent application Ser. No. 09/596,802, filed Jun. 19, 2000, now U.S. Pat. No. 6,775,262, which claims the benefit of U.S. Provisional Application No. 60/188,437, filed Mar. 10, 2000.

BACKGROUND

1. Technical Field of the Invention

The present invention relates to wireless application protocol (WAP) systems, and more particularly, to the mapping of temporary IP addresses to established MSISDN numbers.

2. Description of Related Art

Wireless application protocol (WAP) is positioned at the conversions of two rapidly evolving network technologies, wireless data and the Internet. Both the wireless data market and the Internet are growing very quickly and are continuously reaching new customers. The explosive growth of the Internet has fueled the creation of new and exciting information services. Most of the technology developed for the Internet has been designed for desktop and larger computers and medium to high bandwidth networks.

Hand held wireless devices present a more constrained computing environment compared to desktop computers. They have less powerful CPU's and memory than desktop systems. Similarly, wireless data networks present a more constrained communications environment compared to wired networks. Wireless networks have fundamental limitations with respect to power, available spectrum and mobility. The WAP specification has been developed to address mobile network characteristics by adapting existing network technologies for the Internet to the specialized requirements of hand-held wireless data devices.

Access to a wireless application protocol system utilizing WAP technologies is provided via a WAP gateway node. The WAP gateway node is normally located within an Internet service provider (ISP) providing access to the Internet for mobile terminals. However, the WAP gateway node may alternatively be provided by a mobile services operator. In order to obtain access to the WAP gateway node, a user must be authenticated. There are two possible authentication points for a user. The first authentication point is during setup of a data call. This authentication is handled by the integrated access system (IAS) located within a mobile switching center utilized by the mobile terminal and/or a remote authentication dial-in user service (RADIUS) authentication server located in the WAP network.

The user may also be authenticated when accessing particular servers within the WAP network. This manner of authentication may be handled in two different ways. Proxy authentication may be used wherein the WAP gateway returns a status code of "407" to a WAP browser. This initiates the same type of basic authentication as occurs for a hypertext transport protocol (HTTP) message. A user ID and password are entered by the user in response to this status code and this data is included within every IP packet from the browser.

A WAP gateway supports several different types of bearer messages, for example, IP, SMS, USSD, etc. A MSISDN is used within the WAP gateway to determine if a user is allowed to use the WAP gateway node, to charge for using the WAP gateway node, and to enable charges for specific content to be transmitted. If SMS or USSD bearer protocols are used, the MSISDN is always included within the data packet and this poses no identification problems for the WAP gateway. However, when using the IP protocol, the integrated access system within the mobile switching center allocates a temporary IP address to the mobile terminal. This IP address is included within messages transmitted to the WAP gateway. The WAP gateway has no way at present to determine the MSISDN number associated with a particular IP address. Thus, some manner for enabling the WAP gateway to associate the temporary IP addresses with a fixed MSISDN number is desired.

SUMMARY

The present invention overcomes the foregoing and other problems with a system and method for associating an MSISDN number of a mobile terminal with a temporarily assigned IP address for use with authentication, billing and personalization processes in a network. In response to a wireless network access request by a mobile terminal, a first server located within the wireless network, generates a start packet. The start packet contains an MSISDN of the mobile terminal and an IP address assigned to the mobile terminal by the first server. The start packet is transmitted to a second server within a wireless application protocol network wherein a second server extracts the MSISDN and the assigned IP address from the start packet and stores the MSISDN and the assigned IP address within a database. The database enables storage of the MSISDN and the IP address together such that the database may be accessed using an interface to determine an MSISDN associated with the IP address.

The first server may also generate stop packets responsive to disconnection of the mobile terminal from the wireless network. The stop packet also contains the MSISDN and assigned IP address of the mobile terminal and, responsive to receipt of the stop packet, the second server determines the MSISDN and IP address from the stop packet and deletes these entries from the database.

BRIEF DESCRIPTION OF THE SEVERAL VIEWS OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
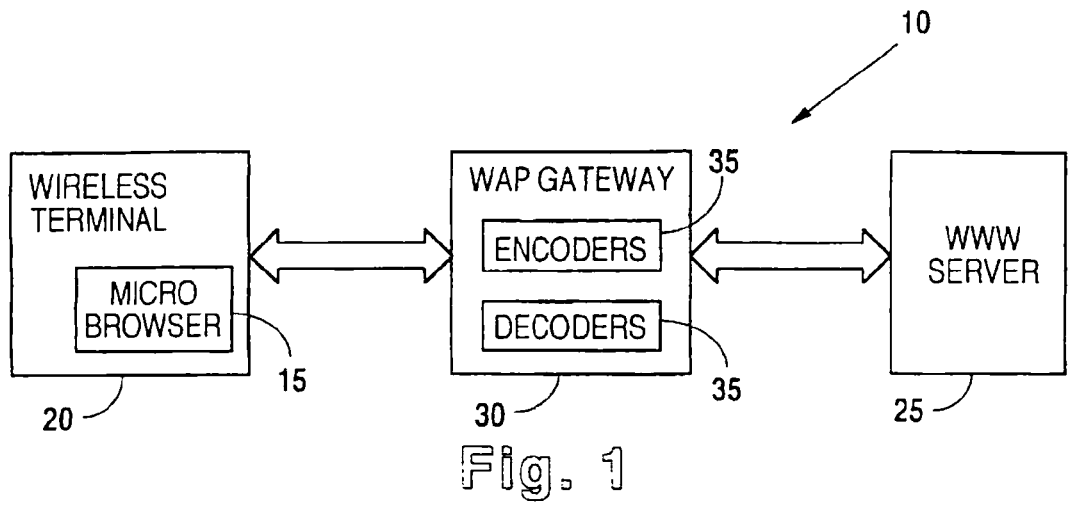
FIG. 1 is a block diagram illustrating a WAP network.

Referring now to the drawings, and more particular to FIG. 1, there is illustrated a WAP network 10. A micro browser 15 within a wireless terminal 20 enables the user to access world wide web servers 25 on the Internet via a WAP gateway server 30. The WAP gateway 30 comprises a protocol gateway which translates requests from a WAP protocol (WSP, WTP, WTLS and WDP) to a WWW protocol (HTTP and TCP/IP). This is accomplished via content encoders and decoders 35 within the WAP gateway server 30.

Figure 2:
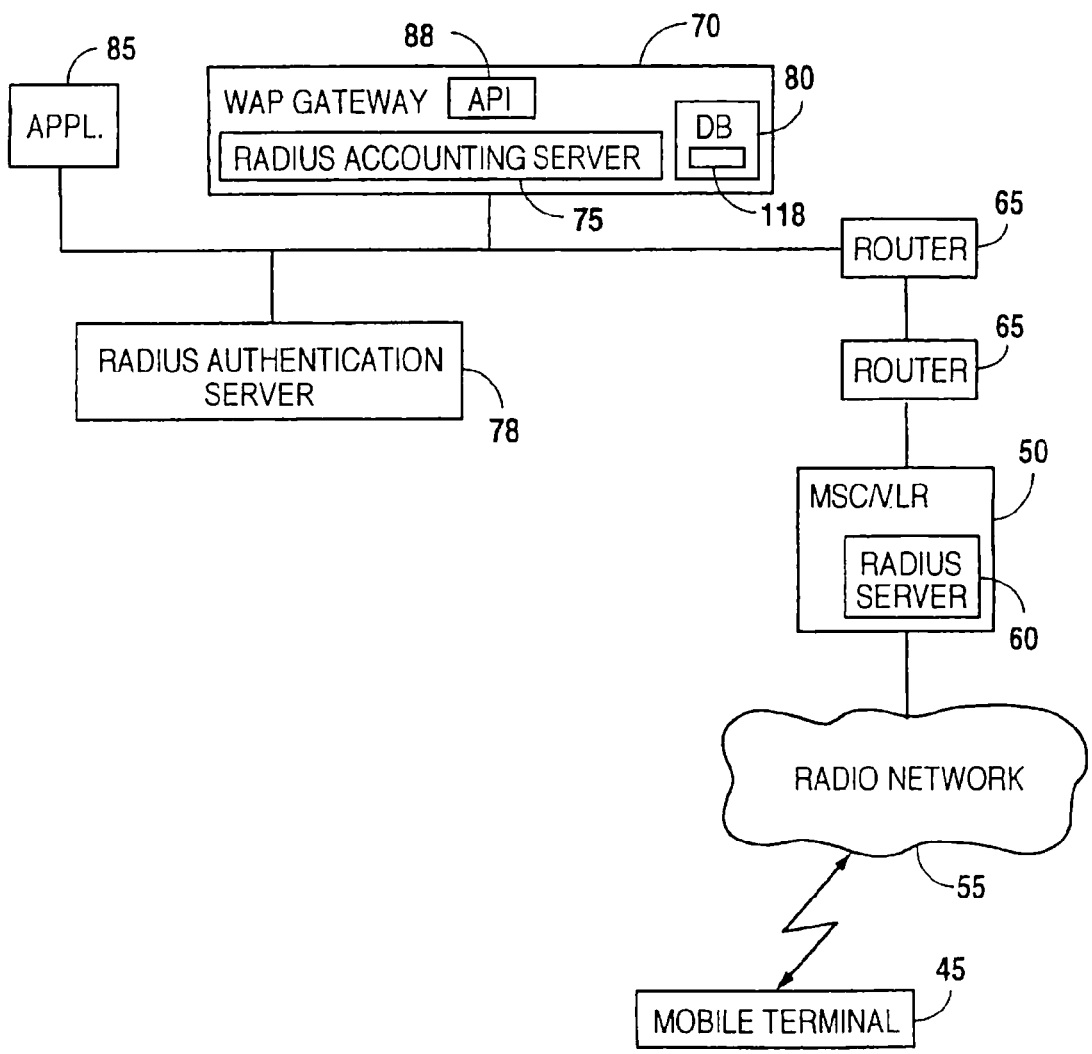
FIG. 2 is a block diagram of a WAP network incorporating the IP to MSISDN mapping technique of the present invention.

Referring now to FIG. 2, there is illustrated a block diagram of a system which utilizes radius accounting messages as a manner for mapping IP addresses to an MSISDN number. While the following description of mapping an IP address to an MSISDN number is done with respect to an authentication process, the system and method may also be used with a billing process, personalization process, etc. The system includes a mobile terminal 45 which may comprise a mobile telephone, portable computer, personal data assistant or any other mobile electronic device capable of communicating with a MSC/VLR 50 via a wireless radio network 55. It should be well understood by one skilled in the art that the wireless radio network for communicating between the mobile terminal 45 and MSC/VLR 50 would consist of a base transceiver station, base station and other components necessary within a wireless radio network.

While the described embodiment uses RADIUS Accounting messages to carry out the described invention, other systems performing similar functions may be used. When a client is configured to use RADIUS Accounting, at the start of service delivery the client will generate an Accounting Start packet describing the type of service being delivered and the user to whom the service is being delivered. The Accounting start packet is sent to the RADIUS Accounting server, which will send back an acknowledgment that the packet has been received. At the end of service delivery the client will generate an Accounting Stop packet describing the type of service that was delivered and optionally statistics such as elapsed time, input and output octets, or input and output packets. The client will send that to the RADIUS Accounting server, which will send back an acknowledgment that the packet has been received. By the present invention, RADIUS is used for transmitting IP-address and MSISDN at session start. Other types of information can also be transmitted, e.g., by using RADIUS Accounting for billing or personalization procedures. Other systems capable of transmitting the IP address and MSISDN information between the networks might also be used in place of a RADIUS system.

The MSC/VLR 50 includes a remote authentication dial-in user service (RADIUS) server 60 configured to transmit a RADIUS accounting message from the MSC/VLR 50 to the WAP gateway 70. The RADIUS accounting messages are transported to the WAP gateway 70 through routers 65 interconnecting the MSC/VLR 50 and the WAP gateway 70. A RADIUS accounting server 75 is located within the WAP gateway 70. The RADIUS accounting server 75 is responsive to the received RADIUS accounting messages from the MSC/VLR 50 and upon receipt of these messages updates a mapping session database 80 within the WAP gateway 70. The mapping session database 80 includes a plurality of storage locations for an assigned temporary IP address and an associated MSISDN of the mobile terminal 45.

The RADIUS accounting messages comprise packets of data which describe the type of service being delivered, and the user to which the service is to be delivered. Information in the packet includes among other things, the MSISDN number, number of frames, and the IP address of the mobile terminal 45. The information within a packet relating to IP address and MSISDN number is used to update the database 80 within the WAP gateway 70. RADIUS accounting messages indicating the stoppage of a connection between a mobile terminal 45 and the WAP gateway 70 cause the database 80 to be updated such that the MSISDN and IP address for the mobile terminal are no longer stored and associated together in the database.

Once a mobile terminal 45 has been properly authenticated by the WAP gateway 70 and the IP address and the IP address and MSISDN of the mobile terminal stored in the database 80, the mobile terminal may access applications 85 within the WAP network. The RADIUS authentication server, in collaboration with a translation application program (API) interface 88, provides a conduit for the database 80, enabling applications to access and determine a MSISDN associated with an IP address for the mobile terminal 45.

Figure 3:
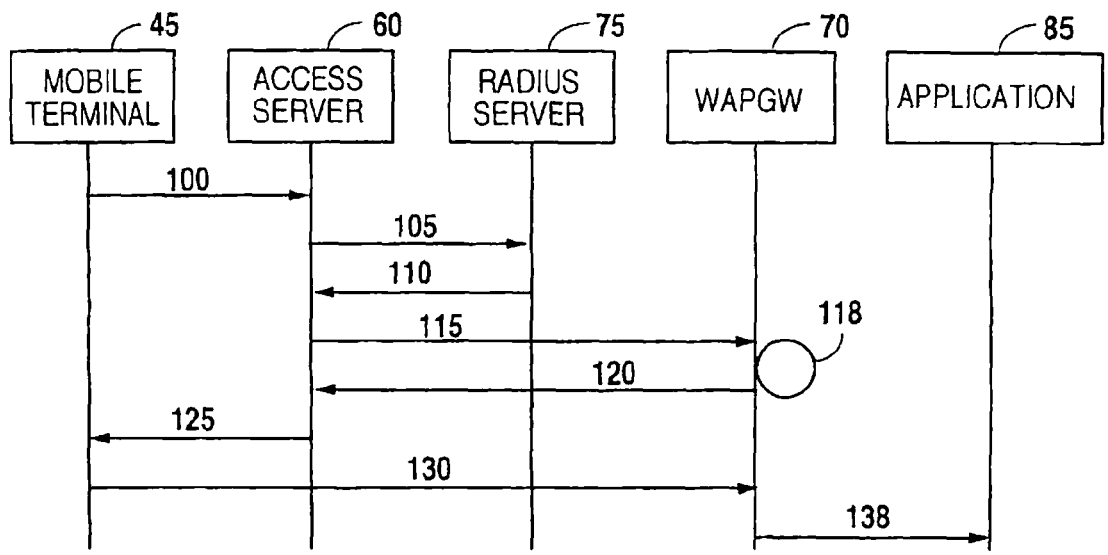
FIG. 3 is a signaling diagram illustrating a request of a particular WAP application by a mobile terminal.

Referring now to FIG. 3, there is provided a first example of a signaling diagram utilizing the method for mapping a MSISDN number to a temporarily assigned IP address for a mobile terminal 45 accessing a WAP gateway 70. The process illustrated in FIG. 3 describes when a mobile terminal 45 requests use of a WAP application 85 residing upon a web server on the Internet. The mobile terminal 45 transmits a message 100 to the access server 60 in order to establish a connection to the access server using the point-to-point protocol (PPP). Before establishing a connection with the mobile terminal 45, the access server 60 performs an authentication process wherein the mobile terminal 45 transmits authentication information including the PPP User ID of the mobile terminal and a password to the access server 60 using a password authentication procedure (PAP).

The access server 60, residing within the mobile switching center 50 (FIG. 2) generates an access request message 105 for transmission to the RADIUS Authentication server 78 located within the WAP gateway 70. The access request message 105 includes the PPP User ID and password transmitted to the access server 60 by the mobile terminal 45. The access request message comprises a request from the access server 60 to the RADIUS server 75 requesting user access to a particular site. The RADIUS server 75 replies to the access server 60 with an access accept message 110 to indicate that access has been granted to the mobile terminal 45.

Next, a PPP connection is established between the access server 60 and the mobile terminal 45. IP packets are transmitted over the connection. The only information included about the sender within the IP packets transmitted over the PPP connection is the IP address of the source mobile terminal 45. The IP address cannot alone be used as a user ID since the IP address is dynamically allocated to the mobile terminal 45 by the access server 60 or the RADIUS server 75 during the PPP connection setup.

To overcome this problem, the IP address and the MSISDN of the mobile terminal 45 are transmitted over the PPP connection from the access server 60 to the WAP gateway 70 as an accounting request message 115 to enable mapping between these identifiers. The IP address and the MSISDN are stored as a record 118 within the mapping session database 80 within the WAP gateway 70. The WAP gateway 70 replies to the accounting request message 115 by means of a mandatory accounting response message 120 to the access server 60 using the RADIUS protocol. Once this connection is established, the user may generate a request 130 for access to a particular WAP application 85 ("service") on a web server. This request is forwarded from the mobile terminal 45 to the WAP gateway 70. The WAP gateway 70 forwards the mobile terminal request 138 to the requested application 85. The WAP gateway 70 may determine the IP address of the mobile terminal 45 by examining the IP packet header to determine the IP address of the mobile terminal. The MSISDN of the mobile terminal 45 is determined by examining the mapping session database 80 and the associated IP address via the application program interface 88. The determined MSISDN is placed in an HTTP header of packets used to contact the WAP application 85.

Figure 4:
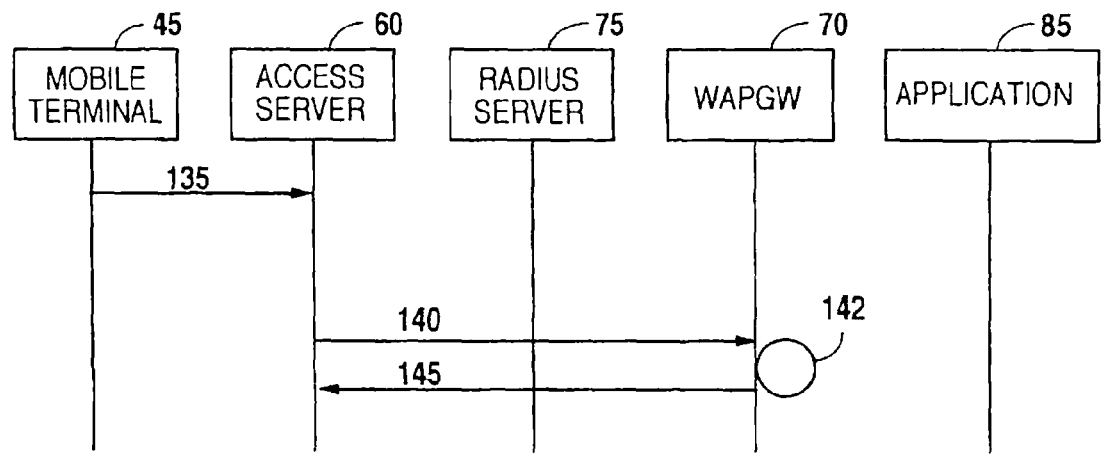
FIG. 4 is a signaling diagram illustrating the termination of a PPP connection between a mobile terminal and the WAP gateway.

Referring now to FIG. 4, there is illustrated a signaling diagram wherein a mobile terminal 45 with an established PPP connection to the access server 60 terminates the PPP connection. Initially, the mobile station 45 terminates at 135 the PPP connection with the access server 60. In response to the termination of the PPP connection, the access server 60 transmits an accounting request stop message 140 to the WAP gateway 70. This request includes the MSISDN and IP address of the mobile terminal 45. In response to the accounting request stop message 140, the WAP gateway 70 removes the entry within the mapping session database 80 associated with the MSISDN number and IP address. The WAP gateway 70 responds to the accounting request stop message by means of an accounting response message 145 acknowledging cancellation of the PPP connection.

The previous description is of a preferred embodiment for implementing the invention, and the scope of the invention should not necessarily be limited by this description. The scope of the present invention is instead defined by the following claims.

What is claimed:

1. A server in a data network for providing a subscriber identity number of a mobile device to an application communicating with the data network, the server comprising:
   means for receiving from a network gateway node, the subscriber identity number of the mobile device and a temporary IP address assigned to the mobile device;
   means for storing the subscriber identity number and the temporary IP address in a database;
   means for receiving from the mobile device, a request directed to the application, the request including the temporary IP address assigned to the mobile device;
   means for determining the subscriber identity number associated with the temporary IP address of the mobile device by accessing the database through a pull application programming interface; and
   means for placing the determined subscriber identity number into a packet header and transmitting the packet header to the application with a data packet.

2. The server as recited in claim 1, wherein the means for receiving the subscriber identity number and the temporary IP address from the network gateway node includes means for receiving an accounting start packet containing the subscriber identity number of the mobile device and the temporary IP address assigned to the mobile device.

3. The server as recited in claim 2, further comprising:
   means for receiving an accounting stop packet when the mobile device ends the session, the accounting stop packet including the subscriber identity number and the temporary IP address assigned to the mobile device; and
   means for deleting the stored subscriber identity number and the temporary IP address from the database responsive to the accounting stop packet.

4. The server of claim 2, further comprising means for transmitting an acknowledgment packet to the network gateway node in response to receiving the accounting start packet.

5. The server of claim 1, wherein the server is used in at least one of an authentication process, a billing process, and a personalization process.

6. The server of claim 1, wherein the subscriber identity number is an MSISDN number of the mobile device.

7. The server of claim 1, wherein the network is a WAP network.

8. The server of claim 1, wherein the server is a RADIUS server.

9. A method in a server in a data network for providing a subscriber identity number of a mobile device to an application communicating with the data network, the method comprising the steps of:
   receiving from a network gateway node, the subscriber identity number of the mobile device and a temporary IP address assigned to the mobile device;
   storing the subscriber identity number and the temporary IP address in a database;
   receiving from the mobile device, a request directed to the application, the request including the temporary IP address assigned to the mobile device;
   determining the subscriber identity number associated with the temporary IP address of the mobile device by accessing the database through a pull application programming interface; and
   placing the determined subscriber identity number into a packet header and transmitting the packet header to the application with a data packet.

10. The method as recited in claim 9, wherein the step of receiving the subscriber identity number and the temporary IP address from the network gateway node includes receiving an accounting start packet containing the subscriber identity number of the mobile device and the temporary IP address assigned to the mobile device.

11. The method as recited in claim 10, further comprising:
    means for receiving an accounting stop packet when the mobile device ends the session, the accounting stop packet including the subscriber identity number and the temporary IP address assigned to the mobile device; and
    means for deleting the stored subscriber identity number and the temporary IP address from the database responsive to the accounting stop packet.

12. The method of claim 10, further comprising transmitting an acknowledgment packet to the network gateway node in response to receiving the accounting start packet.

13. The method of claim 9, wherein the method is used in at least one of an authentication process, a billing process, and a personalization process.

14. A server in a data network for providing a subscriber identity number of a mobile device to an application communicating with the data network, the server comprising:
    means for receiving from the mobile device, a request directed to the application, the request including a temporary IP address assigned to the mobile device;
    means for determining the subscriber identity number associated with the temporary IP address of the mobile device by accessing a database through a pull application programming interface; and
    means for placing the determined subscriber identity number into a packet header and transmitting the packet header to the application with a data packet.

15. A method in a data network for providing a subscriber identity number of a mobile terminal to an application communicating with the data network, the method comprising the steps of:
    performing the following steps in a network node in communication with the mobile terminal:
    generating a start packet in response to an access request from the mobile terminal, the start packet containing a subscriber identification number associated with the mobile terminal and an IP address assigned to the mobile terminal; and sending the start packet to a database, said database receiving and storing the subscriber identification number and the IP address contained in the start packet; and performing the following steps in a server in communication with the database and a plurality of applications:

receiving from the mobile terminal, a request directed to one of the applications, the request including the IP address assigned to the mobile terminal;

utilizing a pull application programming interface (API) to access the database and extract a subscriber identification number associated with the IP address assigned to the mobile terminal;

placing the extracted subscriber identification number into a header; and transmitting the header in a data packet to the application to which the mobile terminal directed the request.

16. A system for associating a subscriber identification number of a mobile terminal with a temporarily assigned IP address, comprising:

a network node for generating a start packet responsive to an access request from a mobile terminal, the start packet containing a subscriber identification number associated with the mobile terminal and the IP address assigned to the mobile terminal;

a database in communication with the network node, said database receiving the start packet from the network node and storing the subscriber identification number and the IP address contained in the start packet; and a server in communication with the database and a plurality of applications, said server including:

means for utilizing a pull application programming interface (API) to access the database and extract the subscriber identification number associated with the IP address received in a request from the mobile terminal directed to one of the applications;

means for placing the extracted subscriber identification number into a header; and means for transmitting the header in a data packet to the application to which the mobile terminal directed the request.

17. A method for providing access to a subscriber identity number associated with a mobile device in a data network, the method comprising:

associating a mobile device with a subscriber identity number;

generating by a network gateway node, a temporary IP address for the mobile device when the mobile device initiates a session;

transmitting by the network gateway node, an accounting start packet to a server, the accounting start packet including the subscriber identity number and the temporary IP address of the mobile device;

wherein the server performs the steps of:

storing the subscriber identity number and the temporary IP address in a database;

receiving from the mobile device, a request directed to an application communicating with the data network, said request including the temporary IP address of the mobile device;

determining the subscriber identity number associated with the temporary IP address of the mobile device by accessing the database through a pull application programming interface;

placing the determined subscriber identity number into a packet header;

transmitting the packet header to the application with a data packet;

receiving an accounting stop packet when the mobile device ends the session, the accounting stop packet including the subscriber identity number and the temporary IP address of the mobile device; and deleting the stored subscriber identity number and the temporary IP address from the database responsive to the accounting stop packet.

18. A system for providing access to a subscriber identity number associated with a mobile device in a data network, the system comprising:

a network gateway node for:

associating the mobile device with the subscriber identity number;

generating a temporary IP address for the mobile device when the mobile device initiates a session; and transmitting an accounting start packet to a server, the accounting start packet including the subscriber identity number and the temporary IP address of the mobile device; and the server in communication with the network gateway node for:

storing the subscriber identity number and the temporary IP address in a database;

receiving from the mobile device, a request directed to an application communicating with the data network, said request including the temporary IP address of the mobile device;

determining the subscriber identity number associated with the temporary IP address of the mobile device by accessing the database through a pull application programming interface;

placing the determined subscriber identity number into a packet header;

transmitting the packet header to the application with a data packet;

receiving an accounting stop packet when the mobile device ends the session, the accounting stop packet including the subscriber identity number and the temporary IP address of the mobile device: and deleting the stored subscriber identity number and the temporary IP address from the database responsive to the accounting stop packet.

* * * * *